United States Patent
Helmus

[11] Patent Number: 6,007,102
[45] Date of Patent: Dec. 28, 1999

[54] ADJUSTABLE VEHICULAR WHEELWELL SKIRTS

[76] Inventor: Herbert John Helmus, P.O. Box 1198, Commack, N.Y. 11725

[21] Appl. No.: 08/918,720

[22] Filed: Aug. 22, 1997

[51] Int. Cl.[6] .......................... B60R 21/34; B60R 19/00; B62B 9/14; E05F 15/06
[52] U.S. Cl. .......................... 280/849; 280/847; 293/58; 296/198
[58] Field of Search .................. 280/847, 848, 280/849, 851; 296/198; 293/38, 58

[56] References Cited

U.S. PATENT DOCUMENTS

| | | | |
|---|---|---|---|
| 1,989,368 | 4/1933 | Knapp | 280/153 |
| 2,010,350 | 3/1934 | Davis | 280/152 |
| 3,784,226 | 1/1974 | Wilfert et al. | 280/157 |
| 4,401,339 | 8/1983 | Rios | 296/1 S |
| 4,489,806 | 12/1984 | Shimomura | 180/903 |
| 4,558,897 | 12/1985 | Okuyama et al. | 296/1 S |
| 4,659,130 | 4/1987 | Dimora et al. | 296/1 S |
| 4,778,212 | 10/1988 | Tomforde | 296/180.1 |
| 4,810,022 | 3/1989 | Takagi et al. | 296/180.5 |
| 4,951,994 | 8/1990 | Miwa | 296/180.1 |
| 4,976,489 | 12/1990 | Lovelace | 296/180.1 |
| 5,462,324 | 10/1995 | Bowen et al. | 293/15 |
| 5,735,560 | 4/1998 | Bowen et al. | 293/15 |

FOREIGN PATENT DOCUMENTS 430879  6/1935  United Kingdom .

*Primary Examiner*—J. J. Swann
*Assistant Examiner*—Christopher Bottorff
*Attorney, Agent, or Firm*—Goldstein & Canino

[57] ABSTRACT

An adjustable wheel-well skirt system for fitting within wheel-well openings of a vehicle and covering the wheel-well openings and wheel-well cavities which are defined by the wheel-well openings. The wheel-well skirt system comprises a number of adjustable wheel-well skirts corresponding in number to the number of wheel-well openings of the vehicle. Each adjustable wheel-well skirt is sized and shaped substantially similar to the size and shape of the respective wheel-well opening it will engage. When secured to the vehicle, each adjustable wheel-well skirt fills the wheel-well opening, giving the vehicle a smooth, continuous appearance. A track extends from each adjustable wheel-well skirt and slideably engages a bracket which is mounted to the vehicle behind the wheel-well opening. Each adjustable wheel-well skirt may slide from a first position where it is flush with a body panel which surrounds the wheel-well opening, to a second position where the adjustable wheel-well skirt slides out of the wheel-well cavity and beyond the wheel-well opening in response to the pivoting of the wheel which is contained within the wheel-well.

3 Claims, 5 Drawing Sheets

ADJUSTABLE VEHICULAR WHEELWELL SKIRTS

FIELD OF THE INVENTION

The invention relates to an adjustable vehicular wheel-well skirt system. More particularly, the invention relates to adjustable vehicular wheel-well skirts which cover the wheel-well openings of a vehicle; thus providing a more aesthetically smooth and pleasing overall appearance while also increasing the aerodynamic efficiency of the vehicle. In addition, in response to a sharp wheel angle due to the vehicle entering a turn, or upon the need of the operator to access the wheels located behind the skirt, the wheel-well skirt can be manually or automatically caused to extend outward beyond the planar body lines of the vehicle.

BACKGROUND OF THE INVENTION

Typical vehicular body shapes of both modern and past automobiles normally possess wheel-wells for the vehicle's individual wheels to rotate freely within. The wheel-well typically comprises the cavity located behind the vehicle's body panels, within which the wheel is secured and permitted to rotate. The opening which permits access to the wheel-well is typically appropriately termed the wheel-well opening. While the wheel-well opening is a necessary component of the vehicle (for several reasons which will be discussed hereafter) it unfortunately results in an unclean appearance to the overall body lines of the vehicle, and increases the drag coefficient of the vehicle thus decreasing the vehicle's fuel efficiency.

It has heretofore been believed that the body panels adjacent to wheel-well cavities must have wheel-well openings carved thereupon, rather than simply encapsulating the -vehicle wheels within their wheel-wells behind said body panels. One reason for such belief is due to the need for the operator of the vehicle to access and remove the vehicle wheel (in the event of a flat tire, for instance). Another reason stems from the fact that upon the operator of the vehicle initiating a turn, the vehicle's front wheels must pivot and usually protrude outward beyond the boundary of the wheel-well opening. If the wheel-well openings were not present, the vehicle's wheel/tire assembly would contact the vehicle body panel and the vehicle would be unable to execute a turn.

Prior art systems have assembled wheel-well skirts which covered a small portion of the wheel-well openings for aesthetic and aerodynamic purposes, but none have fully covered the entire wheel-well openings for the reasons discussed above. Furthermore, these prior art partial wheel-well skirts were only employable on the rear wheel-wells of the vehicle (to avoid the problem encountered when the front wheels pivot during a turn). In addition, these partial wheel-well skirts also required mechanical removal to access the wheels located therebehind (i.e. in the event the operator needed to change a flat tire). No prior art wheel-well skirts or skirt systems exist which entirely encase the vehicle wheels within the wheel-well to provide a smooth, aerodynamic appearance without obstructing access to the wheels or the hindering the vehicle's ability to execute a turn.

While these units may be suitable for the particular purpose employed, or for general use, they would not be as suitable for the purposes of the present invention as disclosed hereafter.

SUMMARY OF THE INVENTION

The present invention relates to an adjustable vehicular wheel-well skirt system. More particularly, the invention relates to adjustable vehicular wheel-well skirts which cover the wheel-well openings of a vehicle, thus providing a more aesthetically smooth and pleasing overall appearance while also increasing the aerodynamic efficiency of the vehicle. In addition, in response to a sharp wheel angle due to the vehicle entering a turn, or upon the need of the operator to access the wheels located behind the skirt, the wheel-well skirt can be manually or automatically caused to extend outward beyond the planar body lines of the vehicle.

In accordance with the invention, there is provided an adjustable wheel-well skirt system which, under normal circumstances, fills the wheel-well opening of a vehicle in order to provide a more flowing and seamless appearance to the vehicle body lines.

Further in accordance with the invention, the adjustable wheel-well skirt system comprises a sensor which, in response to an operator of the vehicle engaging in a turn, sends a signal to an actuator which extends the wheel-well skirts outward beyond the vehicle body panel to allow proper clearance for the wheel contained therebehind to pivot.

Further in accordance with the invention, a manual override switch is provided which, in response to the need of the operator to gain access to a wheel located behind one of the wheel-well skirts, forces said skirt outward beyond the vehicle body panel.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
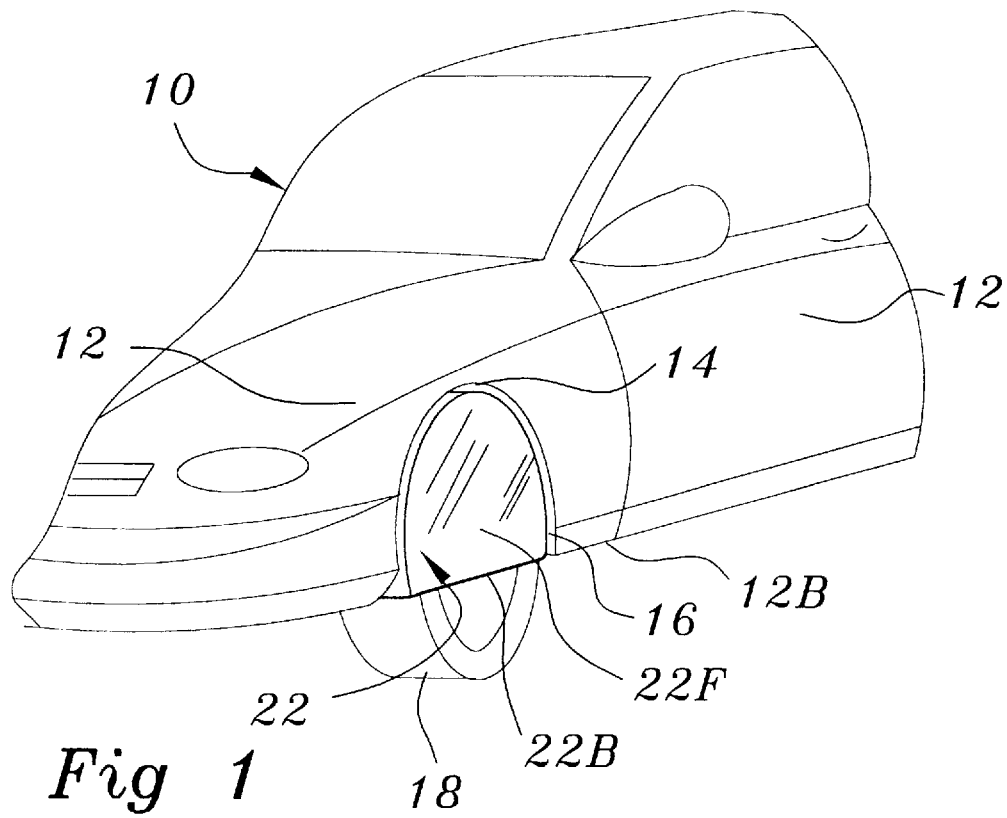
FIG. 1 is a diagrammatic perspective view of a vehicle with a wheel-well skirt of the instant inventive system installed within a wheel-well thereof.
Figure 4:
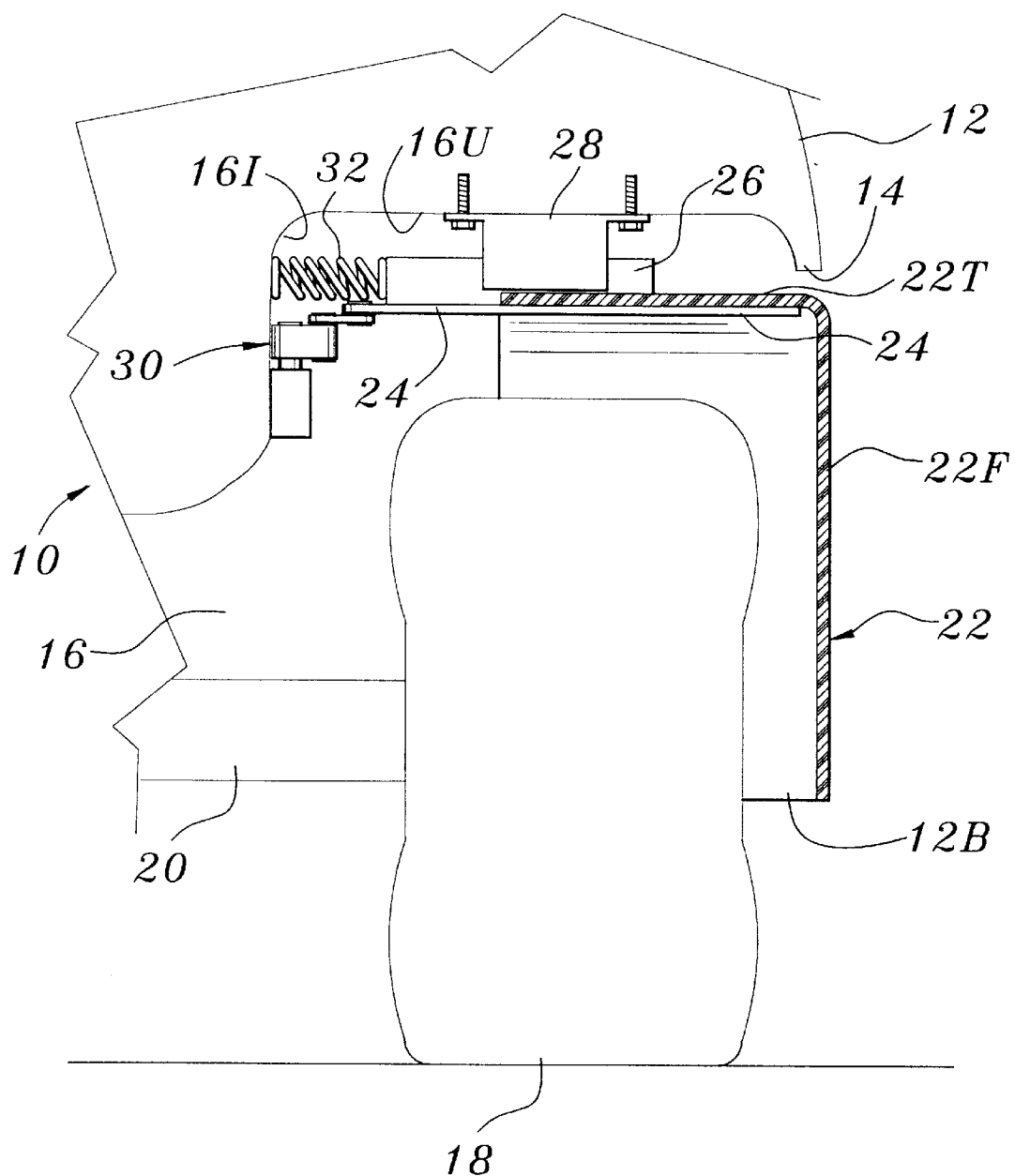
FIG. 4 is a cross sectional view of the adjustable vehicular wheel-well skirt within the wheel-well.

FIG. 1 illustrates a vehicle 10 having a plurality of body panels 12, one such body panel 12 shown having a wheel-well opening 14. The wheel-well opening 14 typically defines an open cavity known as a wheel-well 16 within which one of a plurality of the vehicle's 10 wheels 18 are contained. Reference to FIG. 4 illustrates that in normal circumstances, the vehicle wheel 18 is secured to the vehicle 10 by way of an axle member 20, and permitted to rotate freely within the wheel-well 16.

Figure 2:
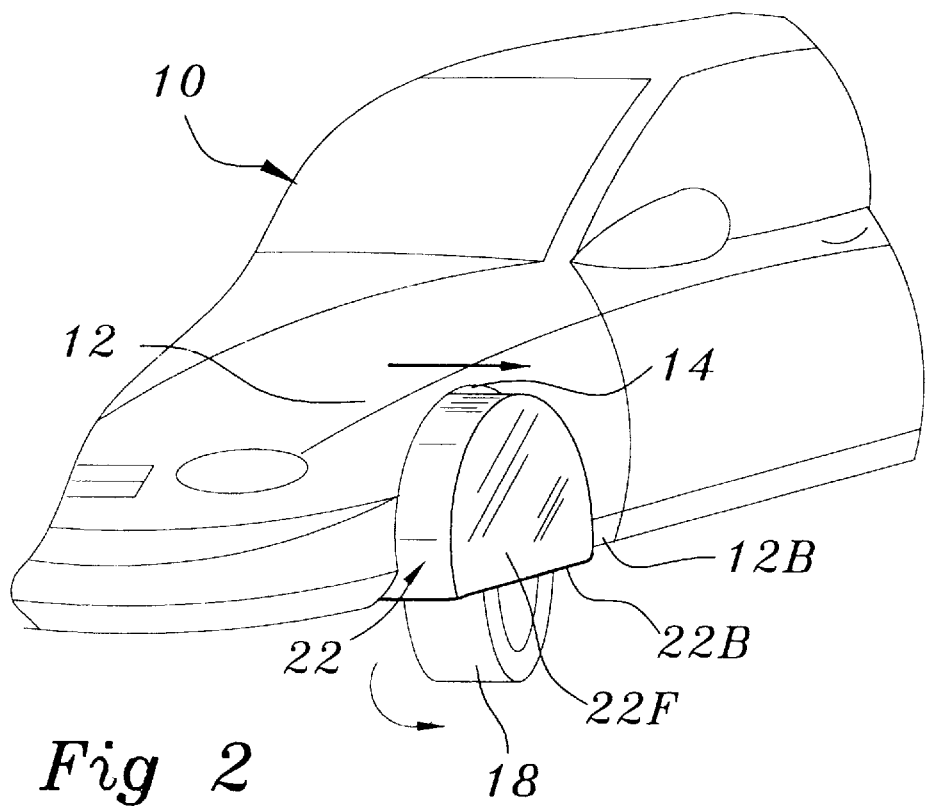
FIG. 2 is a diagrammatic perspective view of the vehicle wheel-well skirt of the instant inventive system in an extended position beyond the vehicle body panel.

FIG. 1 further illustrates one of a plurality of adjustable wheel-well skirts 22 of the instant inventive system installed over the wheel-well opening 14 of the wheel-well 16 of the vehicle 10. The adjustable wheel-well skirt 22 comprises a front face 22F and a bottom edge 22B, such that when the adjustable wheel-well skirt 22 is retracted, the front face 22F is flush with the surrounding body panel 12, and the bottom edge 22B of said adjustable wheel-well skirt 22 is aligned with a bottom edge 12B of the surrounding body panel 12, as is seen in FIG. 1. Accordingly, the majority of the wheel-well opening 14 is enclosed by the adjustable wheel-well skirt 22, and a smooth and seamless appearance of the body panel 12 and entire vehicle 10 results. In certain circumstances, as will be discussed hereafter, the front face 22F of the adjustable wheel-well skirt 22 is caused to extend outward beyond the planar surfaces of the surrounding body panel 12 as seen in FIG. 2.

Figure 3:
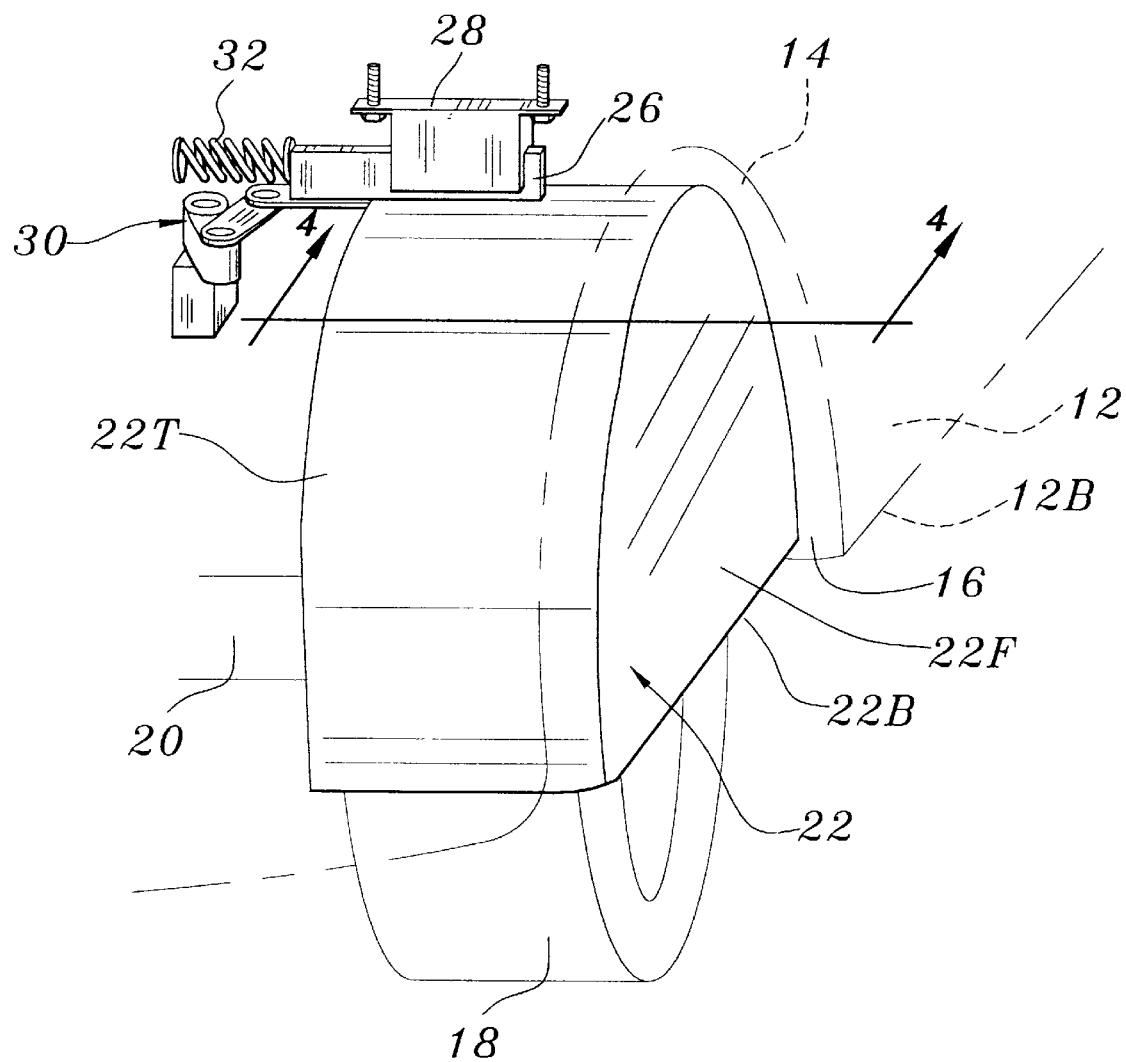
FIG. 3 depicts the adjustable vehicular wheel-well skirt of the instant invention installed within a wheel-well of a vehicle.

Referring to FIG. 3, it is seen that the adjustable wheel-well skirt 22 further comprises a top surface 22T which follows the edge of the front surface 22F and extends essentially perpendicular thereto. The adjustable wheel-well skirt 22 is open opposite the front surface 22F, for reasons which will be discussed hereafter. The depth of the top surface 22T will vary according to the size of the wheel-well 16 and the wheel 18 contained therein. In addition, the shape of the front face 22F and top surface 22T of the adjustable wheel-well skirt 22 will also vary in accordance with the configuration of the wheel-well opening 14, surrounding body panel 12, etc. It must be understood that the size and shape of the adjustable wheel-well skirt 22 is of little importance. Of primary importance is simply that said adjustable wheel-well skirt 22 fill the entire wheel-well opening 14 to provide a seamless, flush appearance thereto.

Reference to FIGS. 3 and 4 together will clearly illustrate the mechanics of the instant inventive system. The adjustable wheel-well skirt 22 is secured to a rigid cross bar 24 by suitable means such as riveting, welding or bolting. While the rigid cross-bar 24 is depicted secured to the underside of the top surface 22T of the adjustable wheel-well skirt 22, said rigid cross-bar 24 may alternatively be secured in any other fashion and at any other location which allows the adjustable wheel-well skirt 22 to be supported firmly within the wheel-well 16. A track 26 is secured to and extends from the adjustable wheel-well skirt 22 (it is shown in the drawings extending from the top surface 22T, but is contemplated to extend from any suitable location such as the front surface 22F) and slideably engages a bracket 28 which is affixed to an upper wheel-well surface 16U. Through such configuration, the adjustable wheel-well skirt 22 is permitted to slideably extend outward beyond the wheel-well opening 14 of the vehicle 10, as was seen in FIG. 2, or retract back into the wheel-well opening 14 to a position where said adjustable wheel-well skirt 22 is flush with the surrounding body panel 12, as seen in FIG. 1.

The need for the adjustable wheel-well skirt 22 to slideably extend outward beyond the wheel-well opening 14 arises when the operator of the vehicle 10 wishes to execute a turn. As the vehicle's 10 turning wheels 18 pivot, they would contact the adjustable wheel-well skirt 22 if said skirt 22 were not able to extend outward and provide clearance for said wheel 18, as seen in FIG. 6.

Figure 5:
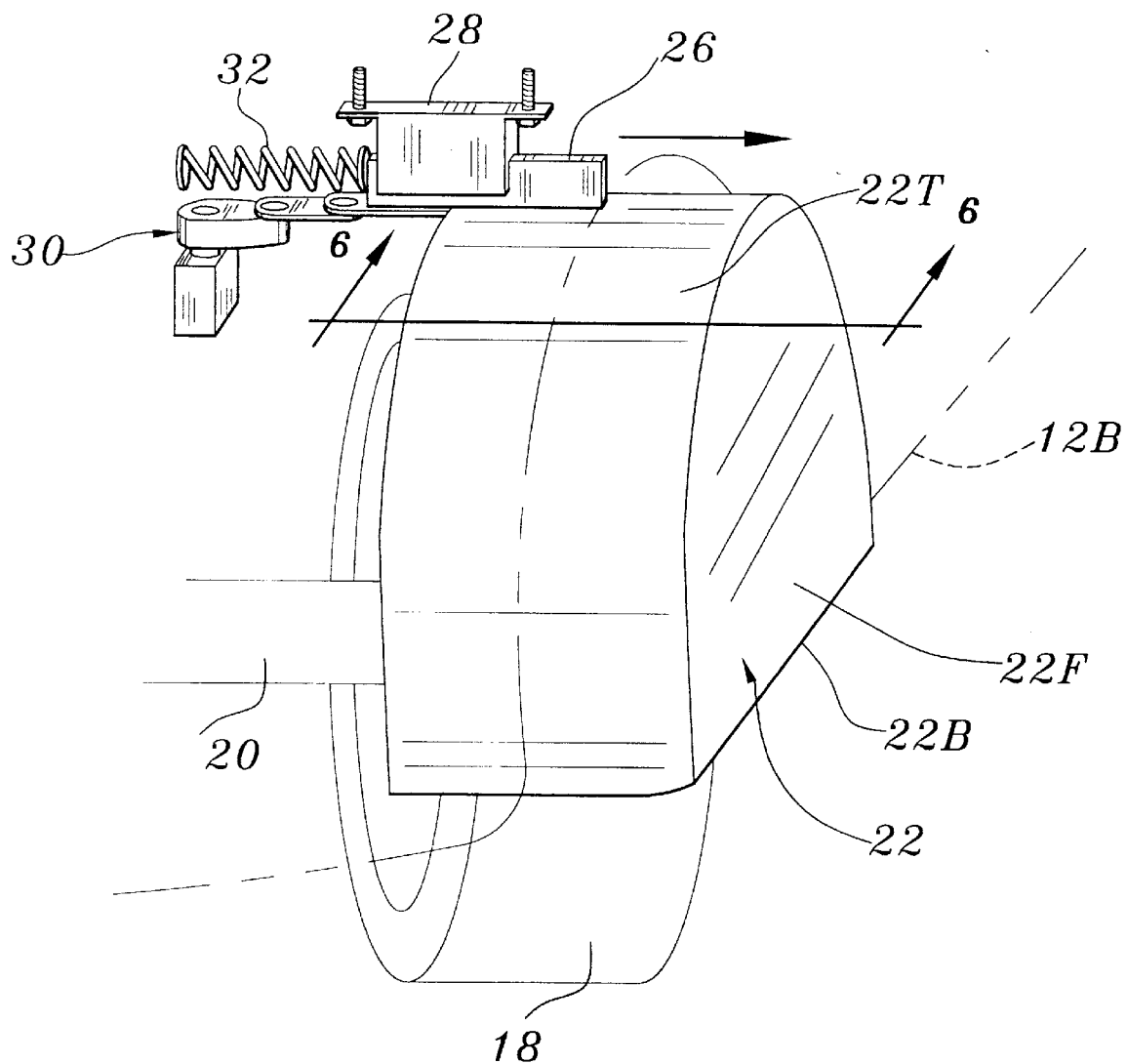
FIG. 5 depicts the adjustable vehicular wheel-well skirt in an extended position outside of the wheel-well.
Figure 6:
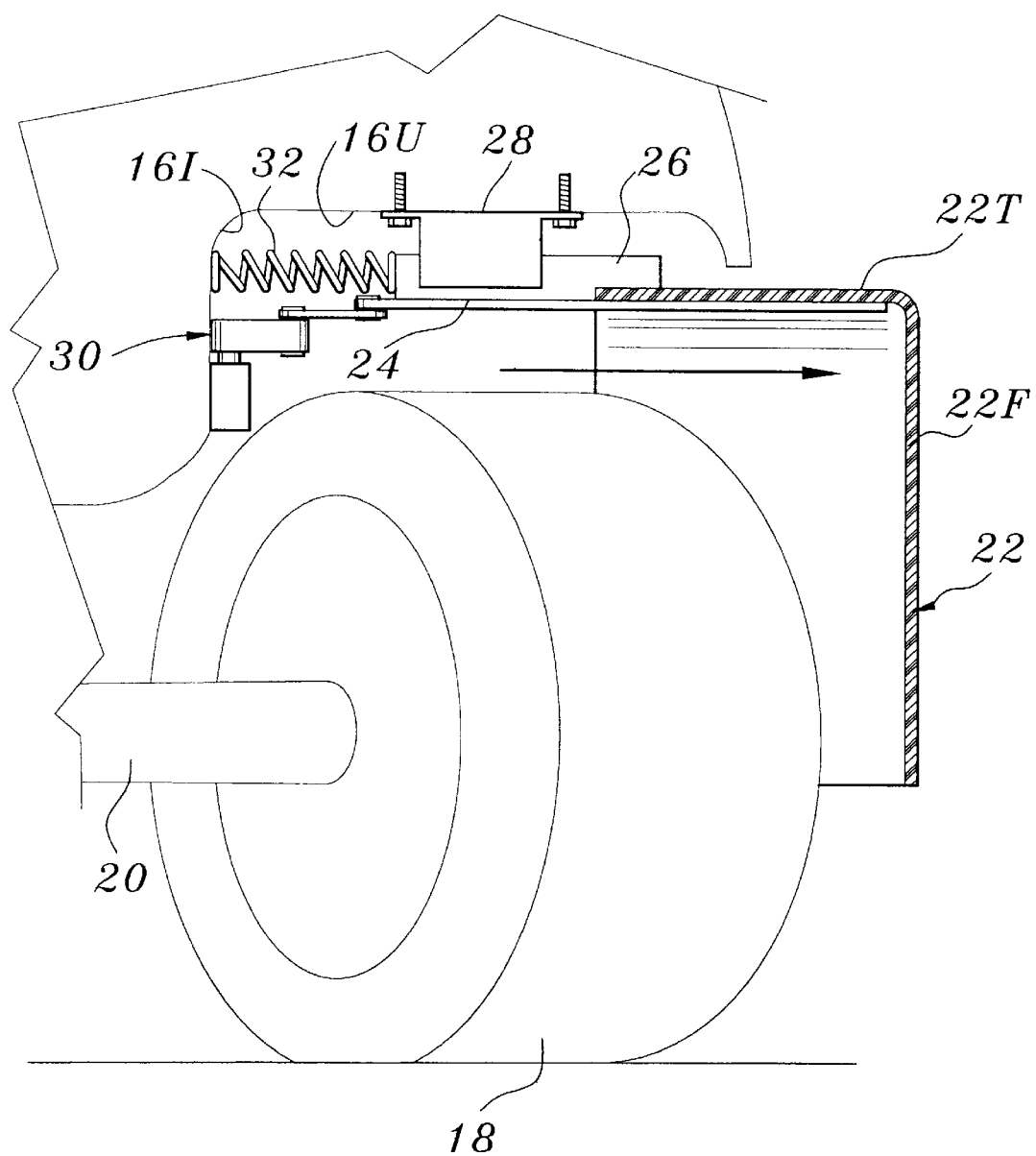
FIG. 6 depicts the adjustable vehicular wheel-well skirt in a further state of extension in response to the pivoting of the vehicle wheel.

Extending means, such as a motor/cam assembly 30 are capable of forcing the adjustable wheel-well skirt 22 outward beyond the wheel-well opening 14, as seen in FIGS. 3 through 6. By affixing the extending means such as the motor/cam assembly 30 to the adjustable wheel-well skirt 22 (via the track 26, for instance, as seen in the illustrations) the extending means can force the adjustable wheel-well skirt 22 outward along the bracket 28 to which it is slideably secured, as seen in FIG. 5 and 6. Retraction means are further provided to assist the adjustable wheel-well skirt 22 in quickly retracting inward after the extending means have forced it outward, such as seen in FIG. 3 and 4. It is contemplated that said retraction means contemplate a spring 32 which is secured between an inner wheel-well surface 16I and the adjustable wheel-well skirt 22 to urge said adjustable wheel-well skirt 22 back inward when the extending means are not acting to force it outward.

It is further and finally contemplated that the extending means be in communication with an actuator (not shown) which, in response to the driver beginning to execute a turn, activates the extending means to extend the adjustable wheel-well skirt 22 outward so that the wheel 18 contained therebehind does not contact said adjustable wheel-well skirt 22. Upon completion of the turn and positioning of the turning wheels 18 back into a substantially straight position where they would not contact the adjustable wheel-well skirt 22, the actuator ceases to activate the extending means, and the system's retracting means would draw the adjustable wheel-well skirt 22 back inward to provide the desired smooth, aerodynamic effect previously experienced.

What is claimed is:

1. An adjustable wheel-well skirt system for a vehicle, the vehicle having a plurality of body panels having wheel-well openings located thereupon, said wheel-well openings each defining a wheel-well cavity within which a wheel of the vehicle is located, comprising:

a) at least one adjustable wheel-well skirt having a front face, a top surface, a bottom edge and an opening opposite the front face, the adjustable wheel-well skirt substantially similar in shape to the vehicle wheel-well opening such that the adjustable wheel-well skirt may be placed within the wheel-well opening so that the front face of said adjustable wheel-well skirt is flush with the surrounding vehicle body panel and the bottom edge of said adjustable wheel-well skirt flush with a bottom edge of the surrounding body panel, so that when the adjustable wheel-well skirt is placed within the wheel-well opening with the vehicle wheel adjacent to the skirt opening, a smooth and seamless appearance of the vehicle is obtained;

b) a generally rectangular track secured along a portion of its length to and extending from the adjustable wheel-well skirt; and c) a generally rectangular bracket which is secured to the vehicle inside the wheel-well cavity and slideably receives the track of the adjustable wheel-well skirt in a slot disposed in one of the sides of the generally rectangular bracket, such that the adjustable wheel-well skirt may slide from a first position where the face of said wheel-well skirt is flush with the body panel which surrounds the wheel-well opening, to a second position where the adjustable wheel-well skirt slides out of the wheel-well and beyond the wheel-well opening in response to the pivoting of the wheel which is contained within the wheel-well cavity.

2. The adjustable wheel-well skirt system of claim 1, wherein extending means are capable of mechanically forcing the adjustable wheel-well skirt outward beyond the wheel-well opening automatically in response to a driver of the vehicle attempting to execute a vehicle turn, whereby the vehicle wheels may pivot in response to said turn, without contacting the adjustable wheel-well skirt.

3. The adjustable wheel-well skirt system of claim 2, further comprising retraction means capable of drawing the adjustable wheel-well skirt inward within the wheel-well to a position where the front face of the adjustable wheel-well skirt is flush with the surrounding body panel, after said adjustable wheel-well skirt has been forced outward by the extending means in response to a vehicle turn.

* * * * *